United States Patent
Bracco (10) Patent No.: US 10,996,629 B2
(45) Date of Patent: May 4, 2021

(54) ELECTROMECHANICAL TIMEPIECE

(71) Applicant: The Swatch Group Research and Development Ltd, Marin (CH)

(72) Inventor: Massimiliano Bracco, Le Landeron (CH)

(73) Assignee: The Swatch Group Research and Development Ltd, Marin (CH)

( * ) Notice: Subject to any disclaimer, the term of this patent is extended or adjusted under 35 U.S.C. 154(b) by 526 days.

(21) Appl. No.: 16/022,933

(22) Filed: Jun. 29, 2018

(65) Prior Publication Data

US 2019/0018368 A1   Jan. 17, 2019

(30) Foreign Application Priority Data

Jul. 17, 2017   (EP) .................................... 17181613

(51) Int. Cl.
| | |
|---|---|
| *G04C 10/00* | (2006.01) |
| *G04B 17/32* | (2006.01) |
| *G04B 17/00* | (2006.01) |
| *G04C 3/10* | (2006.01) |
| *H02P 9/42* | (2006.01) |
| *H02P 3/06* | (2006.01) |

(52) U.S. Cl.
CPC ............. *G04B 17/32* (2013.01); *G04B 17/00* (2013.01); *G04C 3/107* (2013.01); *G04C 3/108* (2013.01); *G04C 10/00* (2013.01); *H02P 9/42* (2013.01); *H02P 3/06* (2013.01)

(58) Field of Classification Search
CPC ........ G04B 17/32; G04C 10/11; G04C 3/108; G04C 3/107; H02P 9/42; H02P 3/06
See application file for complete search history.

(56) References Cited

U.S. PATENT DOCUMENTS 4,785,435 A * 11/1988 Inoue ..................... G04C 10/00
                                                            368/205
6,021,097 A *  2/2000 Kanno ..................... G04C 3/14
                                                            368/157

(Continued)

FOREIGN PATENT DOCUMENTS

EP          1 041 464 A2    10/2000

OTHER PUBLICATIONS

European Search Report dated Feb. 16, 2018 in European Application 17181613.5 filed on Jul. 17, 2017.

*Primary Examiner* — Sean Kayes
(74) *Attorney, Agent, or Firm* — Oblon, McClelland, Maier & Neustadt, L.L.P.

(57) ABSTRACT

The present invention relates to a timepiece comprising:
  a mechanical power source coupled to a time indicating display,
  a generator, wherein the mechanical power source is coupled to the generator,
  a regulator circuit configured for enslaving a generator frequency of the generator to a reference frequency, wherein the regulator circuit is configured for electrically braking the generator when the generator frequency is higher than the reference frequency, wherein the regulator circuit comprises:
  at least a first switch, at least a first inductor and at least a first capacitor, wherein the first switch and the first capacitor are arranged parallel to each other and wherein the first switch and the first capacitor are arranged in series with the first inductor.

13 Claims, 3 Drawing Sheets

(56) References Cited

U.S. PATENT DOCUMENTS

| | | | | |
|---|---|---|---|---|
| 6,414,909 | B1* | 7/2002 | Shimizu | G04C 3/008 |
| | | | | 310/75 A |
| 6,421,263 | B1* | 7/2002 | Shinkawa | G04G 19/02 |
| | | | | 363/132 |
| 6,483,276 | B1* | 11/2002 | Shimizu | G04C 10/00 |
| | | | | 290/1 C |
| 6,636,459 | B1* | 10/2003 | Nagata | G04C 10/00 |
| | | | | 368/203 |
| 2003/0146797 | A1* | 8/2003 | Atsumi | G04F 5/14 |
| | | | | 331/94.1 |
| 2004/0013047 | A1* | 1/2004 | Shimizu | G04C 10/00 |
| | | | | 368/184 |
| 2005/0036405 | A1 | 2/2005 | Born et al. | |
| 2016/0028264 | A1* | 1/2016 | Bernhard | G04C 10/04 |
| | | | | 307/21 |

\* cited by examiner

ELECTROMECHANICAL TIMEPIECE

This application claims priority from European patent application No. 17181613.5 filed on Jul. 17, 2017, the entire disclosure of which is hereby incorporated herein by reference.

FIELD OF THE INVENTION

In one aspect the present invention relates to a timepiece comprising a mechanical power source and comprising a generator configured to produce electrical energy from the mechanical power source. Insofar the invention relates to an electromechanical timepiece, wherein electrical power generated by the generator can be used to operate an electrical circuit that allows and effectuates synchronization of the mechanically operated timepiece with a reference.

BACKGROUND OF THE INVENTION

The document EP 1 544 692 A1 describes an electromechanical timepiece comprising a mechanical energy source coupled, on the one hand, to a first time related information display means and, on the other hand, to a generator. The electromechanical timepiece further comprises a regulator circuit configured to enslave a generator frequency to a reference frequency. The regulator circuit includes switching means that are arranged for electrically braking the generator when the generator frequency is higher than the reference frequency. There are further provided means for accumulating electrical energy dissipated during generator braking. The energy accumulating means are formed by a voltage step-up circuit electrically connected to the generator.

A braking effect that can be provided by the regulator circuit is rather abrupt and therefore imposes a rather large mechanical shock or mechanical impact to the generator in the event of a braking action.

In view of this it is desirable to provide a rather smooth braking of a generator having a lower but eventually more constant impact on the mechanical components of the generator. It is an aim to prolong the lifetime of the generator and its mechanical components. Furthermore, it is an aim to provide a storage of electrical energy during braking events and to decrease energy losses during braking actions of the generator. Implementation of the timepiece and a regulator circuit thereof should be rather simple and cost-efficient.

The document EP 1 041 464 A2 describes an electronically controlled mechanical timepiece. Said timepiece includes a mechanical power source, an electric power generator driven by the mechanical power source, to provide electrical energy through a rectifier circuit, and a rotation controller driven by the electrical energy in order to control the rotation period of the electric power generator. It further includes a braking circuit connected to the electric power generator. Said braking circuit includes a first switch connected to a first output of the electric power generator and a second switch connected to second output of the electric power generator. The braking circuit is not adapted to provide a storage of electrical energy during braking events and to decrease energy losses during braking actions of the generator, which is a drawback.

SUMMARY OF THE INVENTION

In one aspect, there is provided a timepiece comprising a mechanical power source coupled to a time indicating display. The timepiece further comprises a generator. The generator is mechanically coupled to the mechanical power source. In this way, the generator can be driven by the mechanical power source. The timepiece further comprises a regulator circuit that is configured for enslaving a frequency of the generator, hence a generator frequency, to a reference frequency. The regulator circuit is configured for electrically braking the generator when the generator frequency is higher than the reference frequency.

The regulator circuit comprises at least a first switch, at least a first inductor and at least a first capacitor. The first switch and the first capacitor are arranged parallel to each other, and the first switch and the first capacitor are arranged in series with the first inductor. The regulator circuit comprises a rather simple structure and can be implemented on the basis of only a few standard components. The first inductor and the first capacitor provide an alternating braking effect and energy accumulation when repeatedly opening and closing the first switch. In this way, electrical energy dissipated by braking or decelerating the generator can be accumulated by the first capacitor and is not lost. The total energy efficiency of the timepiece can be therefore improved.

By means of the at least first switch, regular and/or irregular braking actions can be repeatedly applied to the generator at a frequency that is decoupled from the operating frequency of the generator. Typically, a switching frequency of the at least first switch is much faster than the generator frequency. By means of a rapid switching of the at least first switch between a conducting and a non-conducting state a rather smooth and long-lasting braking effect can be applied to the generator thus decreasing mechanical impact on the generator during braking actions. In this way, the total lifetime of the generator and of the mechanical components of the timepiece can be prolonged.

Typically, the time indicating display is exclusively operated by the mechanical power source. The reference frequency is typically provided by an electrical reference circuit. The electrical reference circuit may comprise a quartz crystal or may be driven by a quartz crystal. By means of the regulator circuit, the frequency of the generator can be enslaved to the reference frequency, e.g. to the reference frequency of the quartz crystal. Furthermore, the generator is rigidly coupled to a mechanical movement of the timepiece which is operated and driven by the mechanical power source.

The time indicating display is configured and implemented as a mechanical time indicating display. It is coupled to the mechanical power source via the mechanical movement. By enslaving the generator to the reference frequency and by braking the generator in accordance to the reference frequency, the mechanical movement rigidly coupled to the generator is also enslaved to the reference frequency. It is braked or decelerated accordingly. In this way, the mechanical movement and the time indicating display of the timepiece can be synchronized with a reference frequency provided by an electronic circuit.

The power to drive the electronic circuit is exclusively generated by the generator of the timepiece. Insofar, there is no battery required to operate the timepiece.

According to a further example, the first inductor is arranged in series with the generator and the first inductor is further arranged in series with the first switch. Typically, the first inductor is arranged between the generator and the first switch. By means of the first switch the first inductor and hence a first output of the generator can be connected to ground. Typically, by closing the switch, the first output of the generator and the first inductor arranged in series with the first output of the generator are tied to ground. By closing the first switch, a Foucault current and hence electrical energy dissipating from the generator can be at least transiently accumulated in the first inductor. This leads to a braking effect on the mechanical and moving components of the generator.

When opening the first switch, the generator and the first inductor are disconnected from ground. A current from the first output of the generator can no longer dissipate through the first inductor. Rather, electrical energy previously stored in the inductor is now free to transfer towards the at least first capacitor. The electrical energy harvested or accumulated in the first inductor during closing of the first switch is transferable to the first capacitor as soon as the first switch is opened.

In this way, closing of the first switch leads to a temporary or transient accumulation of electrical energy in the first inductor. A subsequent opening of the first switch leads to a transfer of accumulated electric energy from the first inductor towards the first capacitor. Electric charges or accumulated electrical energy can be persistently stored in the first capacitor. This electrical energy can be used otherwise, e.g. for driving electrical components of the timepiece. In effect, the total energy efficiency of the timepiece can be improved.

In another example, the first inductor is connected with one end to a first output of the generator. Furthermore, the first inductor is connected with another end to the first switch and to the first capacitor. Insofar, the first inductor is in series with the first switch. It is also in series with the generator. The first inductor is also in series with the first capacitor. Moreover, the first capacitor is in series with the generator with the first inductor arranged between the first capacitor and the generator. This architecture allows for an alternating activation of electrical energy harvesting capabilities of the first inductor and of the first capacitor. When and during the first switch is closed, electrical energy is harvested by means of the first inductor. When and during the first switch is opened, electrical energy harvested in the first inductor is pushed or transferred to the first capacitor.

According to another example, the first capacitor is connected to a first node that is arranged between the first switch and the first inductor. The first inductor and the first switch are connected via the first node. The first node enables a parallel arrangement and electric connection of the first capacitor and the first switch relative to the first inductor.

In a further example, the timepiece comprises a first diode arrangement. The first diode arrangement is arranged between the first inductor and the first capacitor. Typically, the first diode arrangement is arranged between the first node and the first capacitor. The first diode arrangement enables a current flowing from the first inductor to the first capacitor. The first diode arrangement is further configured to prevent a current flowing from the first capacitor to the first inductor. The diode arrangement may be implemented by means of a conventional diode, a Zener diode or by means of a switchable transistor. By means of the diode arrangement electrical energy accumulated in the first capacitor is prevented from dissipating towards the first node and/or towards the first switch or towards the first inductor.

According to another example, the timepiece comprises a first electrical power output. The first electrical power output is connected to the first capacitor. There may be provided a further node by way of which the first capacitor is connected to the first diode arrangement. The first electrical power output can be connected to this further node. By means of the first electrical power output electrical energy accumulated in the first capacitor can be provided to further electrical components of the timepiece, e.g. for driving those components.

According to another example, the timepiece further comprises a clock signal generator connected at least to the first switch. Typically, the clock signal generator is configured to generate at least a first clock signal and to provide the first clock signal to the first switch. By means of the first clock signal, the first switch can be switched on and off. The first clock signal therefore governs and determines a duty cycle for switching of the at least first switch. The first clock signal, its frequency and/or its duty cycle determine the magnitude of a braking effect obtainable by the regulator circuit.

In typical implementations, the frequency of the first clock signal is larger than the frequency of the generator. In typical implementations, the frequency of the first clock signal is at least 10 times larger than the frequency of the generator. In further implementations, the frequency of the first clock signal is at least 50 times larger or even 100 times larger than the frequency of the generator. Typically, the first clock signal and the generator are decoupled. The first clock signal may be decoupled from the reference frequency. The clock signal generator may comprise an electronically implemented multiplexer. The clock signal generator may be implemented by an electronic multiplexer.

In another example, the first switch, the first inductor and the first capacitor constitute a first branch of the regulator circuit that is connected to a first output of the generator. The first branch of the regulator circuit is on its own operable to provide a desired braking effect on the generator.

In further examples, the timepiece comprises a second branch connected to a second output of the generator. The second branch is symmetric to the first branch of the regulator circuit. Accordingly, the second branch comprises a second switch, a second inductor and a second capacitor. The second switch and the second capacitor are arranged parallel to each other and the second switch and the second capacitor are arranged in series with the second inductor.

The first switch of the first branch and the second switch of the second branch may be implemented symmetrically or identically. The first switch and the second switch may comprise identical switching behavior. The first inductor of the first branch and the second inductor of the second branch may be also implemented symmetrically or identically. The first inductor and the second inductor may comprise identical inductive behavior. Also, the first capacitor of the first branch and the second capacitor of the second branch may be implemented symmetrically or identically. The first capacitor and the second capacitor may comprise identical capacitance.

Moreover, the architectures of the first branch and the second branch are symmetric or substantially identical. All above-mentioned features with regards to the first branch and/or with regards to the first switch, the first inductor and the first capacitor equally apply to the second branch and its components. Also with the second branch, the second inductor is arranged in series with the generator and the second inductor is arranged in series with the second switch. Also, the second inductor is connected with one end to a second output of the generator. The second inductor is also connected with another end to the second switch and to the second capacitor.

The second capacitor is connected to a second node that is arranged between the second switch and the second inductor. Also with the second branch there is provided a second diode arrangement arranged between the second inductor and the second capacitor. The second diode arrangement enables a current flowing from the second inductor to the second capacitor. The second diode arrangement is further configured to prevent a current flowing from the second capacitor to the second inductor.

With the second branch, the second capacitor is typically connected to a second electrical power output. The clock signal generator connected at least to the first switch may be also connected at least to the second switch. Typically, there is provided a second clock signal generator exclusively connected to the second switch. Preferably, there is provided only one clock signal generator providing a first clock signal to the first switch and providing a second clock signal to the second switch. First and second clock signals mutually differ.

Having two individual branches enables a flexible and individually adaptive braking effect on the generator. Since the generator provides an alternating current, each branch can be used for half of a period of the alternating current. The overall efficiency of the regulator circuit and its braking effect on the generator can be therefore improved. Moreover, having two individual branches, each of which being capable to provide a braking effect provides a redundancy in the regulator circuit. A failure safety of the regulator circuit can be therefore improved.

In another example, the timepiece comprises a zero crossing detector arrangement. The zero crossing detector arrangement comprises at least a comparator connected to a first output and to a second output of the generator. Typically, the generator is configured to provide a sinusoidal signal. By means of the zero crossing detector arrangement, a zero crossing of the output signal of the generator can be detected and monitored. This allows for a measurement or determination of the frequency of the generator.

By means of the zero crossing detector arrangement, the frequency of the generator can be measured and hence compared to the reference frequency. In this way, and based on a comparison between the frequency of the generator and the reference frequency, the magnitude and/or duration of a braking effect can be individually modified.

The comparator of the zero crossing detector arrangement is connected to the first output and to the second output of the generator. Insofar, the signals provided at the first output and at the second output of the generator, typically implemented as a micromechanical dynamo, can be compared. As long as a signal at the first output is larger than the signal at the second output, the comparator provides a first value at an output. As soon the signal at the first output is equal to or smaller than the signal at the second output, the comparator provides a second value different to the first value at its output.

In a further example, the zero crossing detector arrangement comprises a storage circuit. The storage circuit comprises a first input connected to an output of the comparator and comprises a second input connected to the clock signal generator. The storage circuit allows for a sampling of the output of the comparator at well-defined instants of time that are governed by the clock signal generator. By means of the storage circuit, fluctuations, temporary effects or transitional signals inevitably arising at one of the first and the second outputs of the generator can be blanked out or faded out. Through the coupling of the storage circuit to the clock signal generator the output of the comparator can be sampled at predefined time instants, where fluctuations or transitional signals do not arise at the output of the comparator.

Typically, the storage circuit comprises a flip-flop circuit or the storage circuit is implemented as a flip-flop circuit. Here, the storage circuit can be implemented rather cost efficient and straightforward.

In another example, the second input of the storage circuit is connected to an output of an AND gate. The AND gate has a first input connected to a first output of the clock signal generator. The AND gate further has a second input connected to a second output of the clock signal generator. The AND gate is configured to trigger the storage circuit. Since the AND gate, in particular first and second inputs thereof are connected to first and second outputs of the clock signal generator the output of the AND gate provides an output signal to the storage circuit and hence to the flip-flop only when first and second clock signal are high simultaneously.

By means of the AND gate and the storage circuit, the output of the comparator can be sampled at time instants where the first and the second clock signals are at logical 1. At all other times the output of the comparator is simply disregarded.

Furthermore and according to another example, the zero crossing detector arrangement comprises a detector connected to an output of the storage circuit. The detector can be implemented as a kind of a counter. It may be configured to determine a time interval between consecutive points of time, where the output of the storage circuit is subject to a change. This time interval is indicative of a cycle time of the generator.

Typically and according to another example, the detector is connected to a processing unit. The processing unit is further connected to the clock signal generator. The processing unit may be configured to compare the output of the zero crossing detector arrangement and hence the output of the detector with the reference frequency. Based on this comparison, the processing unit and/or the clock signal generator are configured to control and to modify the operation of the clock signal generator. In other words, the processing unit and/or the clock signal generator may be configured to modify at least one of the first and the second clock signals.

The processing unit and/or the clock signal generator may be configured to modify a cycle time of at least one of the first and the second clock signals. The processing unit and/or the clock signal generator may be configured to modify a relative phase between the first and second clock signals. Moreover, the processing unit and/or the clock signal generator may be configured to activate one clock signal while deactivating the other clock signal. The processing unit and/or the clock signal generator may be configured to keep one clock signal at a logical 1 while regularly or irregularly alternating the other clock signal. The processing unit and/or the clock signal generator may be further configured to generate concurrent clock signals.

With varying duty cycles, frequencies and relative phases between first and second clock signals, different electromechanical braking effects can be generated on the generator.

BRIEF DESCRIPTION OF THE DRAWINGS

In the following an embodiment of the present invention will be described in more detail by making reference to the drawings, in which.

DETAILED DESCRIPTION OF THE INVENTION

Figure 1:
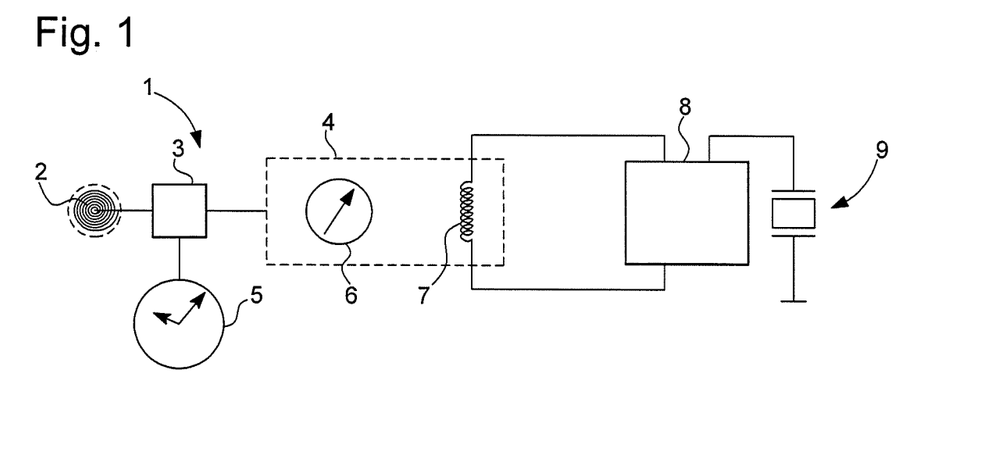
FIG. 1 schematically shows an embodiment of a timepiece comprising a mechanical power source, a generator and the regulator circuit, FIG. 2 schematically shows the architecture of an example of the regulator circuit, FIG. 3 schematically shows a simulation of various signals of the regulator circuit over time, and FIG. 4 schematically shows an enlarged section of signals of the regulator circuit over time.

In FIG. 1, a block diagram of the timepiece 1 is illustrated. The timepiece 1 may be configured as a wristwatch. The timepiece 1 comprises a mechanical power source 2 mechanically connected or mechanically coupled to a mechanical movement 3. The mechanical movement 3 is mechanically coupled to a time indicating display 5. The display 5 is implemented as a mechanical display.

The timepiece 1 further comprises a generator 4. The generator 4 may be implemented as a micromechanical dynamo. The generator 4 is further connected to a regulator circuit 8. The regulator circuit 8 comprises or is electrically coupled to a reference 9. The reference 9 may comprise a quartz crystal or some other reference configured to provide a reference frequency. By means of the regulator circuit 8, the mechanical movement 3 can be synchronized or enslaved with the reference 9.

The regulator circuit 8, implemented as an electronic circuit, is configured to induce a braking effect onto the generator 4. When driven by the mechanical power source 2, the generator 4 may operate at a generator frequency. The generator frequency may be slightly higher than the reference frequency. In order to synchronize the mechanical movement 3, i.e. the generator 4, with the reference 9, the generator 4 is subject to a braking effect applied and induced by the regulator circuit 8.

Figure 2:
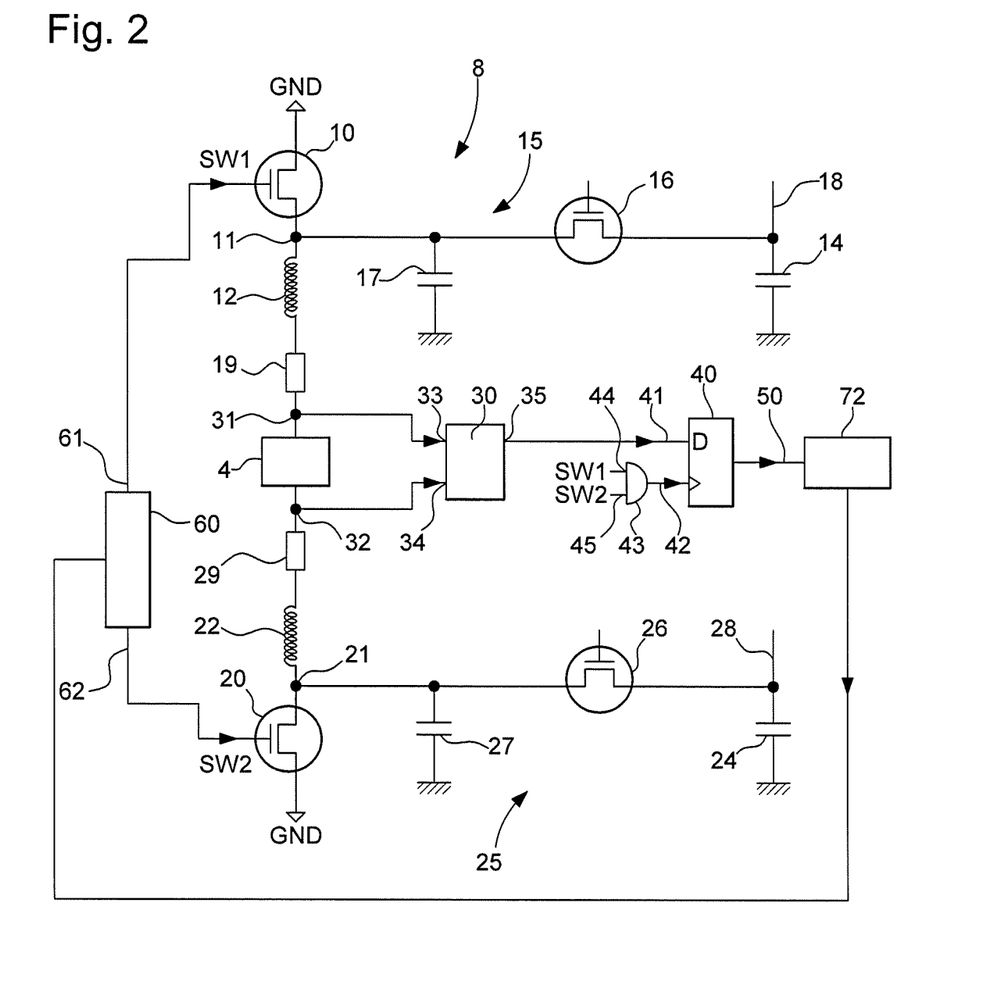

Typically, the generator 4 comprises a rotatable rotor 6 and a stator 7. As shown in FIG. 2, the generator 4 further comprises a first output 31 and a second output 32. At the first and at the second outputs 31, 32, an alternating current and hence an alternating voltage is generated when the rotor 6 is rotationally driven by mechanical movement 3.

In FIG. 2 a block diagram of one embodiment of the regulator circuit 8 is provided. The regulator circuit 8 comprises a first branch 15. The first branch 15 comprises at least a first switch 10, a first inductor 12 and at least a first capacitor 14. As illustrated, the first switch 10 and the first capacitor 14 are arranged parallel to each other. The first switch 10 and the first capacitor 14 are arranged in series with the first inductor 12. The inductor 12 may be implemented as a coil.

The first inductor 12 is arranged in series with the generator 4. One end of the first inductor 12 is connected to the first output 31 of the generator 4. Typically, the other end of the inductor 12 is connected to the first switch 10. Hence, the first inductor 12 is arranged in series with the first switch 10.

That end of the first switch 10 which is not connected to the first inductor 12 is connected to ground. When the first switch 10 is closed or when the first switch 10 is conducting the first output 31 of the generator 4 is connected to ground via the first inductor 12. In such a situation, a current is drawn from the generator 4. Consequently, a braking effect is imposed on the generator 4. When the first switch 10 is opened, the first inductor 12 is disconnected from ground. A current then no longer dissipates from the generator 4 towards the first switch 10. Electrical energy stored in the inductor 12 during a previous phase, during which the first switch 10 was closed, may now transfer to the first capacitor 14.

That end of the first inductor 12 facing away from the generator 4 is permanently connected via a first node 11 to the first capacitor 14. Insofar, electrical charges and hence electrical energy previously and preliminarily harvested in the first inductor 12 can be accumulated in the first capacitor 14 as soon as the first switch is opened.

Between the first node 11 and the first capacitor 14 there is provided a first diode arrangement 16. The first diode arrangement 16 enables a current flowing from the first inductor 12 to the first capacitor 14. Furthermore, the first diode arrangement 16 is configured to prevent a current flowing from the first capacitor 14 back to the first inductor 12. The diode arrangement 16 may be implemented as a diode, as a Zener diode or as a transistor that is switched in accordance to the direction of current flowing from the first node 11 to the first capacitor 14.

The first capacitor 14 is further connected to a first power output 18. Electric energy accumulated in the first capacitor 14 can be withdrawn from the first capacitor 14 via the first output 18. Via the first output 18, electrical energy harvested and accumulated during and due to a controlled braking of the generator 4 can be provided to further electronic components of the timepiece 1.

In the first branch 15 there is further illustrated a first parasitic capacitor 17. The first parasitic capacitor is representative for any parasitic capacitive effects of the first branch 15. The first parasitic capacitor 17 is arranged between the first node 11 and the first capacitor 14. In the sketch of FIG. 2, there is further illustrated a first parasitic resistor 19. The first parasitic resistor 19 is arranged between the first inductor 12 and the first output 31 of the generator 4. The first parasitic resistor 19 is representative for any parasitic resistive effects of the first branch 15.

There is further provided a second branch 25 that is connected to the second output 32 of the generator 4. The second branch 25 is symmetric or substantially identical to the first branch 15. The second branch 25 comprises a second inductor 22, a second switch 20 and a second capacitor 24. Also here, the second switch 20 and the second capacitor 24 are arranged parallel to each other. The second switch 20 and the second capacitor 24 are arranged in series with the second inductor 22. As described above in connection with the first branch 15 the second branch 25 also comprises a second node 21 that is located between the second switch 20 and the second inductor 22. The second branch 25 further comprises a second diode arrangement 26 which enables a current flowing from the second inductor 22 to the second capacitor 24. The second diode arrangement 26 is further configured to prevent a current flowing from the second capacitor 24 to the second inductor 22.

Like the first branch 15 also the second branch comprises a parasitic resistor 29 and a parasitic capacitor 27.

The regulator circuit 8 further comprises a zero crossing detector arrangement 70. The zero crossing detector arrangement 70 is configured to determine and to detect the generator frequency, i.e. the frequency at which the generator 4 is operating or rotating. For this, the zero crossing detector arrangement 70 comprises a comparator 30. The comparator 30 comprises a first input 33 connected to the first output 31 of the generator 4. The comparator 30 further comprises a second input 34 connected to the second output 32 of the generator 4. The comparator 30 further comprises an output 35 that is indicative of a comparison of signals obtained from the first and from the second outputs 31, 32 of the generator 4, respectively.

The zero crossing detector arrangement 70 further comprises a storage circuit 40 connected to the output 35 of the comparator 30. The storage circuit 40 may be implemented as a flip-flop circuit. It comprises a first input 41 connected to the output 35 of the comparator 30. The storage circuit 40 comprises a second input 42 connected to an AND gate 43. The AND gate 43 comprises a first input 44 and a second input 45. First and second inputs 44, 45 are provided with first and second clock signals SW1 and SW2, respectively. First and second clock signals SW1 and SW2 are generated by a clock signal generator 60. The clock signal generator 60 comprises a first output 61 to provide the first clock signal SW1. The clock signal generator 60 further comprises a second output 62 in order to provide the second clock signal SW2. The first and the second clock signals SW1 and SW2 are also provided to the first and to the second switches 10, 20. Hence, the first switch 10 is driven by the first clock signal SW1 and the second switch 20 is driven by the second clock signal SW2. The first and the second switches 10, 20 typically comprise a transistor, such as a MOSFET transistor or a transistor implemented in CMOS technology.

Since the two clock signals are also provided to the AND gate 43 the second input 42 of the storage circuit 40 is only provided with a logical 1 if both clock signals are at logical 1 simultaneously. In this way, the output of the comparator 30 is sampled only when both clock signals SW1, SW2 are high.

The storage circuit 40 further comprises an output 50 that is connected to a detector 72. Every time when the signals provided at the first output 31 and the second output 32 of the generator change their sign an alternating signal is provided at the output 35 of the comparator 30. The detector 72 is configured to count or to monitor the temporal behavior of the signal at the output 50 of the storage circuit 40. Typically, the detector 72 is configured to measure a time interval between two consecutive changes of the digital signal obtainable at the output 50 of the storage circuit 40. This time interval represents the frequency at which the generator 4 operates.

There may be further provided a logic circuit (not illustrated) that is connected to both, the detector 72 and to the clock signal generator 60. Alternatively, such a logic circuit may be also implemented in any one of the detector 72 and the clock signal generator 60. Moreover, the detector 72 and the clock signal generator 60 may be implemented in a common integrated circuit (not illustrated).

The logic circuit may be configured to compare the reference frequency provided by the reference 9 with the frequency determined by the zero crossing detector arrangement 70. If the measured frequency of the generator 4 is larger than the reference frequency the logic circuit is configured to adapt and to modify at least one of the clock signals SW1 and SW2 in order to modify a braking impact or braking effect on the generator 4.

Typically, at least one of the clock signals SW1 oscillates at a frequency that is larger than the frequency of the generator 4. The frequency of the clock signal SW1 or SW2 may be 10 times or even 100 times larger than the frequency of the generator 4.

Figure 3:
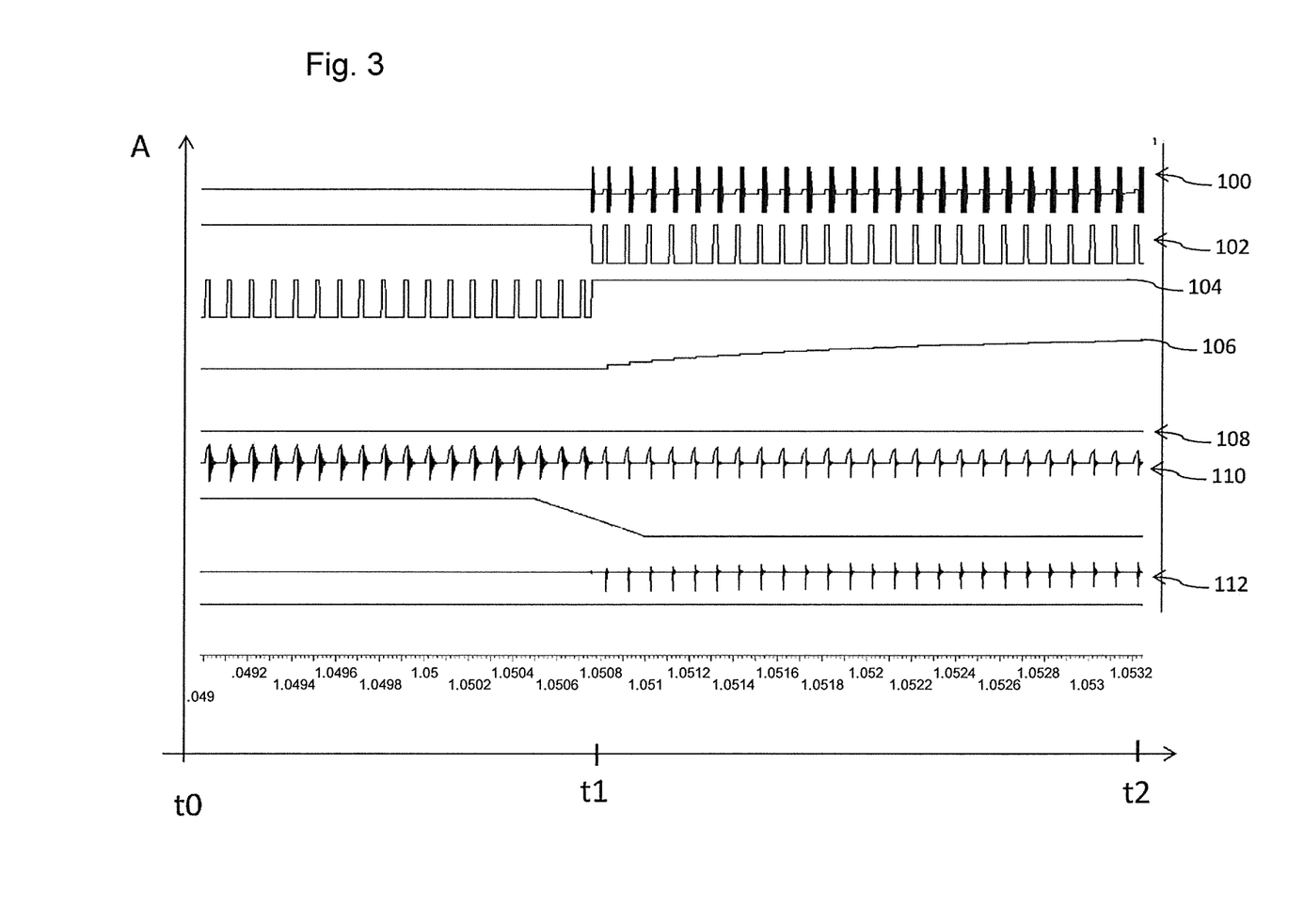

In the diagram according to FIG. 3 various amplitudes A of various signals are illustrated over time. The signal 100 represents a voltage provided at the first output 31 of the generator 4. The signal 102 represents a voltage of the first clock signal SW1. The signal 104 represents voltage of the second clock signal SW2. The signal 106 represents a voltage signal at the first power output 18. The signal 108 is representative of a voltage signal at the output 50 of the storage circuit 40. The signal 110 represents a current at the first inductor 12 and the signal 112 is representative of a voltage at the first output 31 of the generator 4.

The diagram according to FIG. 3 is divided in 2 sections. A first section extends from an initial time t0 to a first time t1 and a second section extends from the first time t1 to a second time t2. In the first section, the first clock signal SW1 is high while the second clock signal SW2 oscillates at a given frequency. Accordingly, during time intervals during which the second clock signal SW2 is high and the second switch 20 is closed a current is drawn from the generator 4. When the second clock signal SW2 returns to zero there is a bouncing observable in the current that decays. This bouncing is due to the permanent conductive connection between the second inductor 22 and the second capacitor 24 as well as due to the permanent conductive connection between the first inductor 12 and the first capacitor 14.

At the time t1 the first clock signal SW 1 starts to alternate while the second clock signal SW2 is permanently high. As can be seen from the signal 110 the bouncing of the current at the node 11 is reduced since the electric energy harvested in the first inductor 12 during phases at which the first switch 12 is closed is transferred to the first capacitor 14 and is hence accumulated in the first capacitor 14. The accumulation of electrical energy in the first capacitor 14 is immediately apparent from signal 106 showing a staircase like increase of the voltage of the first capacitor 14.

Accordingly, by regularly switching the first switch 12 also a corresponding alternating voltage 100 is provided at the first output 31 of the generator 4. The voltage signal 100 is sampled in accordance to the frequency and duty cycle of the first clock signal SW1. The amplitude of the voltage signal 100 slowly rises. The envelope frequency of the voltage signal 100 is much smaller than the frequency at which the first clock signal SW1 oscillates during the time interval between t1 and t2.

The repetitive opening and closing of the first switch 12 induces a kind of a viscose braking effect onto the generator 4. To summarize, a mechanical shock and a mechanical impact acting on the rotor 6 of the generator 4 can be substantially reduced compared to conventional solutions in the art. This will help to prolong the lifetime of the mechanical components of the timepiece 1, especially of the micromechanical generator 4.

Figure 4:
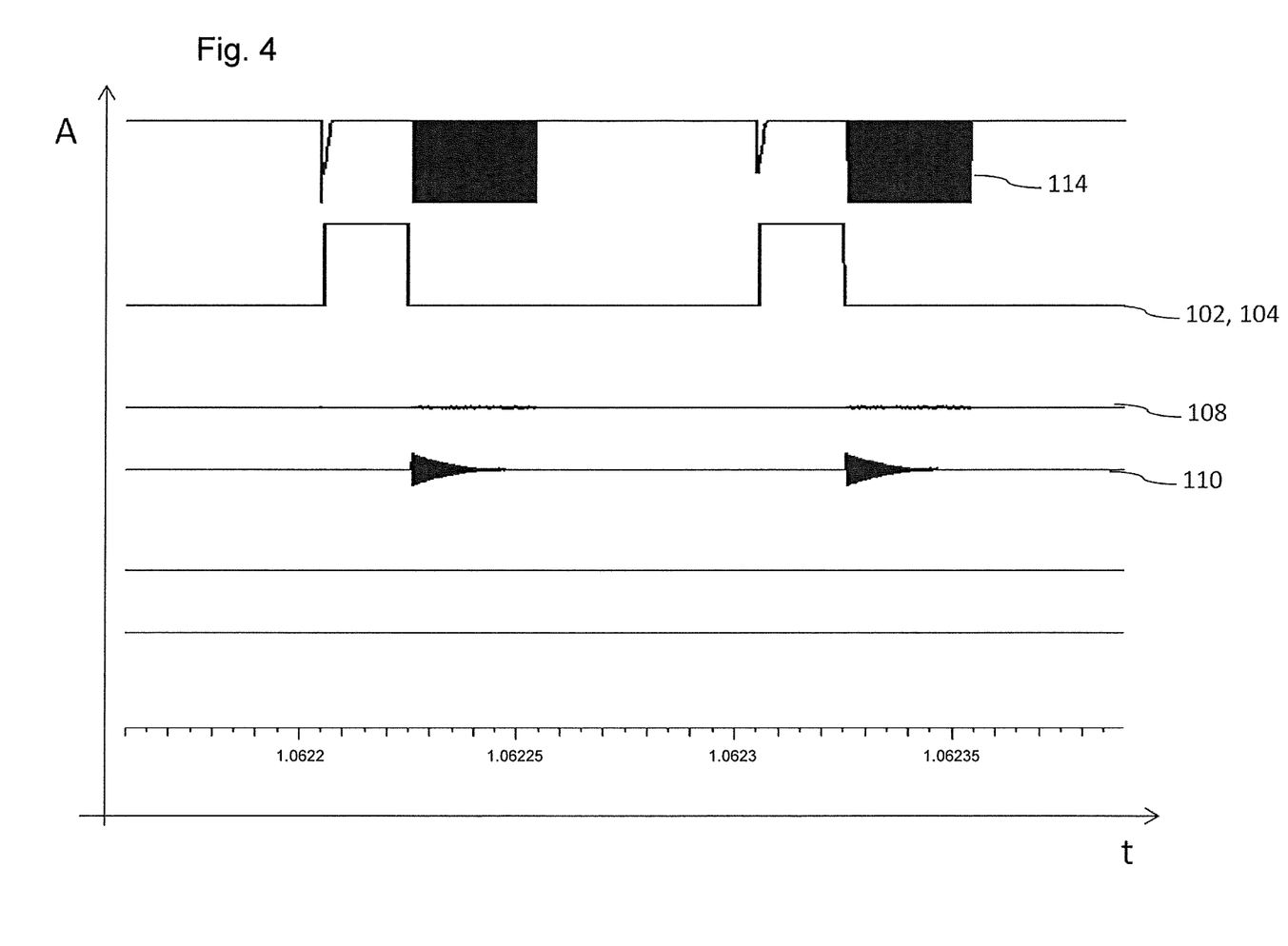

In FIG. 4, a further diagram is given showing at least some of the signals of FIG. 3 at an enlarged timescale. In addition to the illustration of FIG. 3, there is shown the voltage signal 114 at the output of the comparator 30. At every activation or deactivation of one of the branches 15, 25 the comparator output 114 oscillates and exhibits a bouncing behavior. In order to fade out such a bouncing and to avoid perturbing of the zero crossing detector arrangement 70 by this bouncing behavior it is intended that only the rising edge of the clock signal SW1 or SW2 induces a sampling of the output of the comparator 30 by means of the flip-flop 40.

What is claimed is:

1. A timepiece comprising:
   a mechanical power source coupled to a time indicating display,
   a generator, wherein the mechanical power source is coupled to the generator,
   a regulator circuit configured for enslaving a generator frequency of the generator to a reference frequency, wherein the regulator circuit is configured for electrically braking the generator when the generator frequency is higher than the reference frequency,
   wherein the regulator circuit comprises:

at least a first switch, at least a first inductor and at least a first capacitor, wherein the first switch and the first capacitor are arranged parallel to each other and wherein the first switch and the first capacitor are arranged in series with the first inductor, which is arranged in series with the generator, and a first diode arrangement arranged between the first inductor and the first capacitor and wherein the first diode arrangement enables a current flowing from the first inductor to the first capacitor and wherein the first diode arrangement is configured to prevent a current flowing from the first capacitor to the first inductor.

2. The timepiece according to claim 1, wherein the first inductor is connected with one end to a first output of the generator and wherein the first inductor is connected with another end to the first switch and to the first capacitor.

3. The timepiece according to claim 1, wherein the first capacitor is connected to a first node that is arranged between the first switch and the first inductor.

4. The timepiece according to claim 1, wherein the first capacitor is connected to a first electrical power output.

5. The timepiece according to claim 1, further comprising a clock signal generator connected at least to the first switch.

6. The timepiece according to claim 5, wherein the clock signal generator is configured to generate at least a first clock signal and to provide the first clock signal to the first switch, which can be switched on and off, said first clock signal therefore governing and determining a duty cycle for switching of at least the first switch.

7. The timepiece according to claim 1, wherein the first switch, the first inductor and the first capacitor constitute a first branch of the regulator circuit (8) that is connected to a first output of the generator.

8. The timepiece according to claim 7 and further comprising a second branch connected to a second output of the generator, wherein the second branch is symmetric to the first branch and wherein the second branch comprises a second switch, a second inductor and a second capacitor, wherein the second switch and the second capacitor are arranged parallel to each other and wherein the second switch and the second capacitor are arranged in series with the second inductor.

9. The timepiece according to claim 8, wherein it includes a clock signal generator to the first switch and to the second switch, wherein the clock signal generator is configured to generate at least a first clock signal and to provide the first clock signal to the first switch, which can be switched on and off during a first time interval, and the second switch is in a constant high level, and wherein the clock signal generator is configured to generate at least a second clock signal and to provide the second clock signal to the second switch, which can be switched on and off, during a second time interval following the first time interval, and the first switch is in a constant high level.

10. The timepiece according to claim 1, further comprising a zero crossing detector arrangement comprising at least a comparator connected to a first output and to a second output of the generator.

11. The timepiece according to claim 10, wherein the zero crossing detector arrangement further comprises a storage circuit comprising:

a first input connected to an output of the comparator and a second input connected to the clock signal generator.

12. The timepiece according to claim 11, wherein the second input of the storage circuit is connected to an output of an AND gate having a first input connected to a first output of the clock signal generator and having a second input connected to a second output of the clock signal generator.

13. The timepiece according to claim 11, wherein the zero crossing detector arrangement comprises a detector connected to an output of the storage circuit.

\* \* \* \* \*